[15] 3,671,883
[45] June 20, 1972

[54] PROCESS AND APPARATUS FOR EFFECTING HIGH GAS FLOW IN DISCHARGE TUBE OF GAS LASER

[72] Inventor: Erik Algot Smars, Taby, Sweden
[73] Assignee: AGA Aktiebolag, Lindingo, Sweden
[22] Filed: Oct. 20, 1970
[21] Appl. No.: 82,274

[30] Foreign Application Priority Data

Oct. 20, 1969 Sweden..............................14322/69

[52] U.S. Cl..............................331/94.5, 313/231, 315/111
[51] Int. Cl.......................................................H01s 3/04
[58] Field of Search...................331/94.5; 313/231; 315/111

[56] References Cited

UNITED STATES PATENTS

| | | | |
|---|---|---|---|
| 2,753,479 | 7/1956 | Aughey et al. | 313/231 X |
| 2,819,423 | 1/1958 | Clark | 313/231 UX |
| 2,929,952 | 3/1960 | Giannini | 313/231 |
| 3,297,899 | 1/1967 | Pratt et al. | 313/231 |
| 3,302,127 | 1/1967 | Shao-Chi Lin | 331/94.5 |
| 3,364,387 | 1/1968 | Anderson | 313/231 X |
| 3,372,296 | 3/1968 | Naff | 313/231 |
| 3,522,551 | 8/1970 | Fendley | 331/94.5 |
| 3,520,612 | 7/1970 | Hoffman | 313/231 X |
| 3,596,202 | 7/1971 | Patel | 331/94.5 |

OTHER PUBLICATIONS

Sobale et al.: "Carbon Dioxide Lasers," Soviet Physics Uspekhi, Vol. 10, No. 2, Sept–Oct. 1967, pp. 153–155.

*Primary Examiner*—Ronald L. Wibert
*Assistant Examiner*—Edward S. Bauer
*Attorney*—Larson, Taylor and Hinds

[57] ABSTRACT

Gas lasers characterized by high gas flow through the discharge tube of the gas lasers are obtained by feeding the gas to the discharge tube radially in a plurality of sections along the discharge tube and preferably removing the gas via outlet sections provided between the gas inlet sections.

The holes or slots through which the gas is radially introduced may form a certain angle with the radius so as to give a rotary movement to the gas introduced and/or an angle with a plane perpendicular to the axis so that the inflowing gas is given an axial velocity component.

6 Claims, 3 Drawing Figures

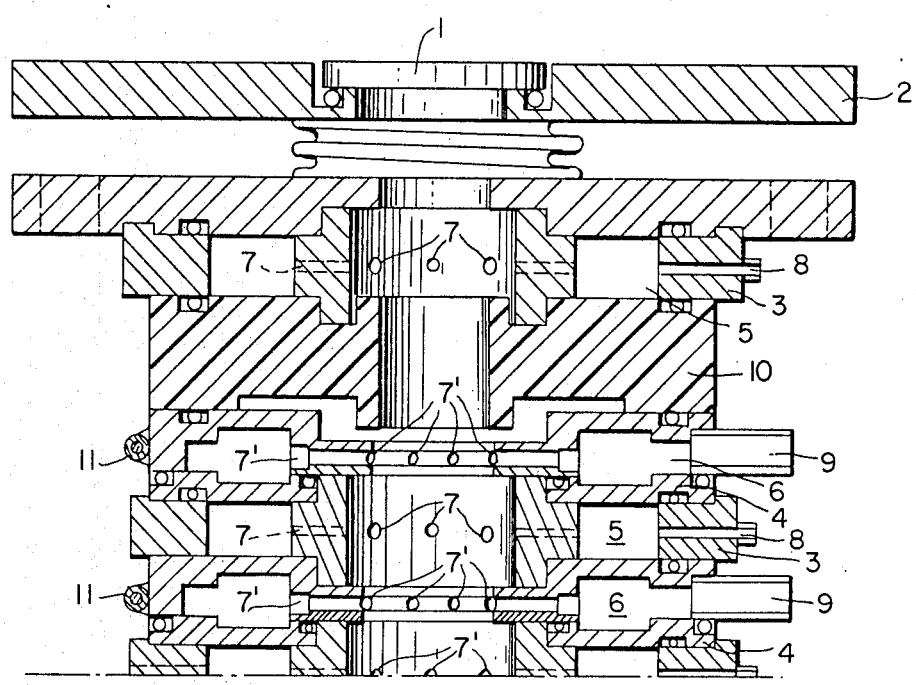
FIG. 1
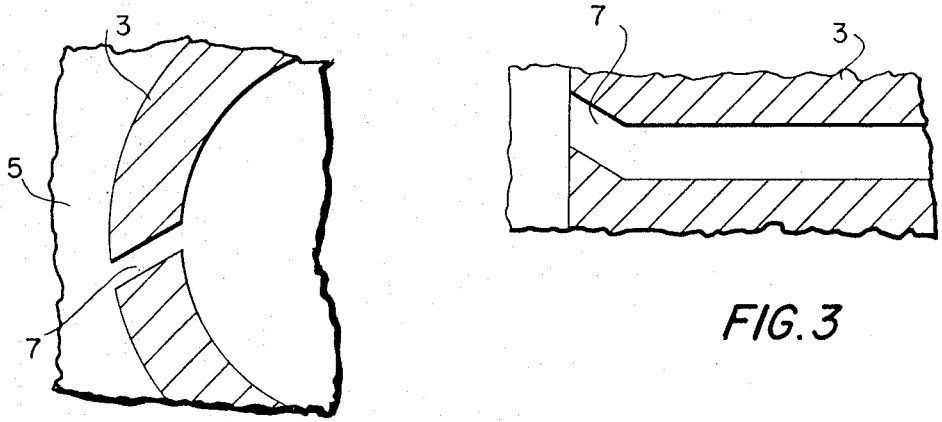
FIG. 2
FIG. 3
INVENTOR
ERIK A. SMARS
BY Larson, Taylor and Hinds
ATTORNEYS

PROCESS AND APPARATUS FOR EFFECTING HIGH GAS FLOW IN DISCHARGE TUBE OF GAS LASER

The present invention relates to a process for bringing about a high gas flow through the discharge tube of a gas laser and to a gas laser operating according to this process.

To obtain a large optical amplification in the laser medium, i.e., the gas, in a gas laser, (e.g., $CO_2$-laser), it is necessary that the molecules and atoms of the gas have a thermal energy which is as low as possible, whilst the electrons or other exciting processes which are produced through gas discharges and which excite the atoms or molecules will represent a considerably higher thermal energy. To bring about this deviation from thermal equilibrium, the gas has to be subjected to continuous cooling.

In conventional gas lasers (e.g., $CO_2$ lasers) one relies on thermal conduction and diffusion through the gas out to the walls of the discharge tube for the generation of this temperature difference between atoms or molecules and electrons.

It has also been suggested to provide a rapid exchange of gas in the discharge volume so that cold gas is continuously fed and gas heated by the discharge is removed. By this method a value of the radiated laser effect per unit of gas discharge volume is achieved which is 20 to 50 times higher than by the conventional $CO_2$ laser technique. In an experiment a gas flow through the discharge volume was used which was directed longitudinally in relation to the beam path. In another experiment the gas flow was directed transversely in relation to the beam path.

In the present invention a high gas flow through the discharge tube is brought about by feeding gas to the discharge tube radially in a large number of sections along the discharge tube. These feed sections consist of rings with slots or holes distributed about the periphery of the discharge tube and communicating with the inside of the tube. These slots or holes may be directed radially, in which case the gas flow into the discharge tube through the slots or holes is in a radial direction. The holes or slots may also form a certain angle with the radius, in which case the gas in the discharge tube and its surroundings is given a rotary movement and the gas discharge becomes stabilized by the gas whirl which arises. If desired, the holes or slots may form an angle with a plane perpendicular to the axis, so that the inflowing gas receives an axial velocity component.

Between gas feed sections there are provided outlet sections, through which the gas is removed from the discharge tube. The sections for the feed of gas as well as the sections for the removal of gas are constructed and arranged so that a high degree of axial rotational symmetry of the gas flow pattern is attained. The gas feed sections and removal sections can each be constructed exclusively of electrical insulating material, exclusively of metal or the different sections may be constructed alternately of metal and electrical insulating material. In this way a gas flow of a high degree of rotational symmetry with a combination of radial, axial and possibly tangential movement of the gas is obtained. Thus, by the present invention rapid feed of cold gas and a rapid removal of heated gas is achieved in all parts of the discharge volume.

The gas discharge may take place between two cylindrical electrodes in conventional manner, so that the discharge flow occurs in axial direction parallel with the laser radiation. Another manner is to make use of a high-frequency discharge with or without electrodes.

The invention will be further described with reference to the accompanying drawing wherein:

FIG. 1 is a schematic longitudinal section of one end portion of a gas laser;

FIG. 2 is a top elevational view showing an ambodiment of the invention wherein the holes or slots 7 are disposed in a manner that forms an angle with the radius of the discharge tube; and FIG. 3 is a side sectional view of one end of a gas laser showing an embodiment of the invention wherein the holes or slots 7 are disposed in a manner that forms an angle with a plane perpendicular to the axis of the discharge tube.

Referring to the FIGS., numeral 1 designates a laser mirror which is fixed in a mirror holder 2. The mirror holder 2 is arranged so that it is displaceable and rotatable in a conventional manner in relation to the discharge tube of the laser. The discharge tube is made up of a number of sections 3 and 4, numeral 3 designating the gas feed sections and 4 the gas removal or outlet sections. Between each pair of feed sections 3 is arranged an outlet section 4.

Each section 3 has an annular chamber 5, located uniformly around the periphery of the section and is provided with a plurality of holes or slots 7 (shown partly by phantom lines in FIG. 1) which communicates with annular chamber 5. Likewise each section 4 has an annular chamber 6 around the periphery of the section and is also provided with holes or slots 7' which communicate with annular space 6. The chamber 5 in the feed sections 3 are connected via a duct 8 to a source of gas (not shown) and the chambers 6 in the outlet sections 4 are connected to heat exchangers (not shown) via a duct 9. A closed gas system can be constructed if the heat exchangers serve as a source of gas and the gas is conducted from there by means of a pump or blower system (also not shown) to the feed sections 3. The walls of the outlet sections 4 are advantageously liquid-cooled for instance by passing water through tubes 11 rigidly connected with the sections 4.

Referring to FIG. 2, in another preferred embodiment of the invention the holes or slots 7 in gas feed section 3 are disposed in a plane perpendicular to the axis of the gas discharge tube and in a direction that forms an angle with the internal radius of the gas discharge tube. By giving the holes or slots a tangential direction component in this manner there is imparted a rotary motion to the gas flow in the gas discharge tube.

In yet another embodiment of the invention, shown in FIG. 3, the holes or slots 7 in the gas feed sections are set at an angle to a plane perpendicular to the axis of the gas discharge tube. By this arrangement the inflowing gases are given an axial velocity component.

To reduce the risk of a destruction of the coating on the mirrors 1 at the ends of the discharge tube, electrodes 10 are inserted, to the extent as they are used, after the first feed section 3 reckoned from the end of the discharge tube. The electrodes 10 are shaped cylindrically, so that the gas flows through the same.

As mentioned above, FIG. 1 only shows the one end of the discharge tube, but the other end is of the same shape as the end shown, except for being its mirror image. Between the tube ends an unlimited number of feed and outlet sections can alternatingly be arranged.

It is claimed:

1. In a gas laser comprising an elongated cylindrical gas discharge tube having a discharge volume and a mirror at each end of said discharge volume, the improvement which comprises providing the discharge tube with a plurality of axial inlet sections and an axial outlet section between each adjacent pair of inlet sections, each section having an annular chamber surrounding the discharge volume and a plurality of holes or slots in uniform distribution around the periphery of said discharge volume, said holes or slots connecting said annular chamber and said discharge volume for conducting lasing gas to and from, respectively, said discharge volume.

2. The improvement of claim 1 wherein the holes or slots are in a plane perpendicular to the axis of the discharge tube and form an angle with the radius so that the gas flow receives a velocity component along the tangent in the plane.

3. The improvement of claim 1 wherein the holes or slots are in a plane perpendicular to the axis of the discharge tube and form an angle with the plane so that the gas flow receives an axial velocity component.

4. The improvement of claim 1 wherein the outlet sections are made of metal.

5. The improvement of claim 4 wherein the outlet sections are provided with liquid cooling means.

6. The improvement of claim 1 wherein after the first feed section, reckoned from each end of the discharge tube, a cylindrically shaped electrode is arranged, through which current is fed and between which gas discharge takes place.

* * * * *